Oct. 16, 1923.

A. M. BALLARD 1,471,088

OIL AND GAS SEPARATOR

Filed March 16, 1922

WITNESS:
Rob R Kitchel

INVENTOR
Albert M. Ballard
BY
Frank L Busser
ATTORNEY.

Patented Oct. 16, 1923.

1,471,088

UNITED STATES PATENT OFFICE.

ALBERT M. BALLARD, OF YALE, OKLAHOMA, ASSIGNOR TO SUN OIL COMPANY, OF PHILADELPHIA, PENNSYLVANIA, A CORPORATION OF NEW JERSEY.

OIL AND GAS SEPARATOR.

Application filed March 16, 1922. Serial No. 544,302.

*To all whom it may concern:*

Be it known that I, ALBERT M. BALLARD, a citizen of the United States, residing at Yale, county of Payne, and State of Oklahoma, have invented a new and useful Improvement in Oil and Gas Separators, of which the following is a full, clear, and exact description, reference being had to the accompanying drawings, which form a part of this specification.

My invention relates to apparatus for separating oil and gas direct from wells, and is more particularly applicable to that type of apparatus comprising a tank into which the mixture of oil and gas is caused to flow, a lower outlet for oil, a higher outlet for gas, and a float connected with a valve in one outlet or with valves in both outlets.

In apparatus of this character, more or less oil, in the form of a fine suspension, is carried out with the gas. The object of the present invention is to separate this oil from the gas and return it to the body of oil in the tank. More specifically stated, the object of the present invention is to separate most of the oil from the gas by one operation and then separate the remainder of the oil from the gas by another operation; the two operations progressing simultaneously in the same apparatus.

A preferred embodiment of the invention is shown in the accompanying drawings, in which—

Figure 1:
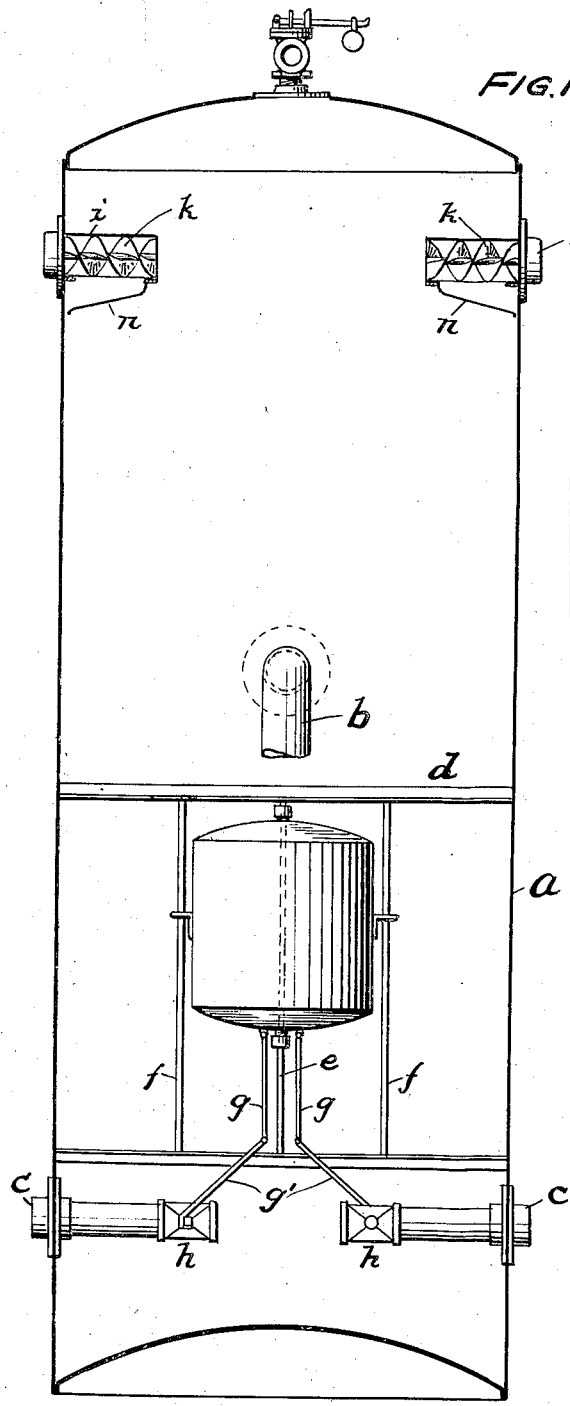
Fig. 1 is an elevational view of the interior of the tank.
Figure 2:
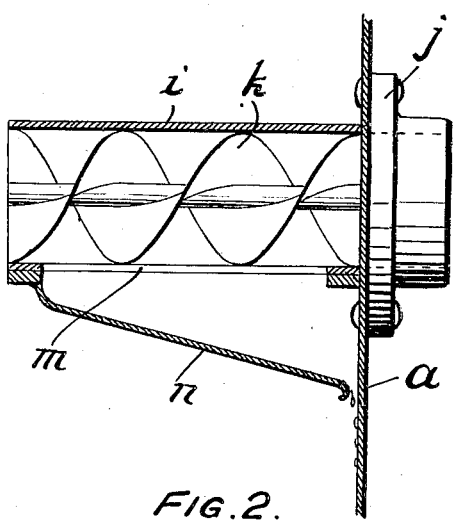
Fig. 2 is an enlarged sectional view of the device for cleaning out oil from the outflowing gas.

The flow tank $a$ is provided with pipes $b$ for admission of gas and oil, oil outlet pipes $c$ leading to the stock tanks, and gas outlets (to be hereinafter described) leading to the compressor.

Extending across the tank are cross bars $d$, $d$, between which extend a central vertically extending guide rod $e$ and two side guide rods $f$.

A float is movable vertically on the guide rods and is connected, by links $g$ and levers $g'$, with valves $h$ on the oil outlet pipes.

Communicating with the interior of the tank, near the top thereof, are one or more pipes or tubes $i$ for egress of the gases. Preferably, each pipe is horizontally disposed and has a flange $j$ bolted to the outside of the tank and projects into the interior of the tank.

Within the pipe $i$ is a fixed screw or spiral $k$ of the Archimedean type and of the same diameter, and preferably of about the same length, as the part of the pipe that projects into the tank.

The lower wall of the pipe $i$ is provided with a longitudinally extending slot $m$, which extends nearly throughout the length of the pipe.

Below the slot $m$ is a deflector $n$, which, preferably, is a trough secured to the pipe at about its inlet end and inclined downward toward the tank wall and terminating a short distance therefrom.

As the gas and oil enter the tank, the gas fills the tank and flows out the gas outlet pipe $i$. The level of the oil rises, lifting the float, thereby opening the valves $h$ on the oil line. This allows the oil to flow into the stock tanks. As the oil recedes, the float falls, thereby moving the valve $h$ toward its closed position. The gas may be allowed to flow out continuously, as in the tank illustrated in the drawings, although the float may be connected with the gas outlet and intermittently close or throttle it, as in the Ballard Patent No. 1,327,691, dated January 13, 1920.

As the gases, which carry some oil in fine suspension, or in the form of a mist or vapor, flow out through the pipe $i$, they are given a whirling motion, due to the presence of the screw; and any liquid or oil vapor that may be in suspension in the gas, in conformity with the laws of physics governing centrifugal force, will be thrown against the wall of the pipe, the vapor being condensed. The accumulating liquid runs down the inner wall of the pipe and escapes through the slot $m$, dropping down upon the deflector $n$, which carries it to the tank wall, down which it flows into the body of oil in the lower part of the tank.

By the foregoing arrangement, not only is the gas cleaned or scrubbed just before leaving the apparatus, but means are provided to guard against: First, the "picking up," by the scrubbed or cleaned gas, of further liquids that may be suspended in the body of gas; and second, the "picking up," by the body of the gas in the container, of oil that has so been scrubbed or cleaned out of the outflowing gas.

Having now fully described my invention, what I claim and desire to protect by Letters Patent is:

1. In an oil and gas separator, the combination with a tank having an oil and gas inlet, an oil outlet arranged at a relatively low elevation, a gas outlet arranged at a relatively high elevation, the fluid admitted to the tank dividing into a lower body of oil and a superincumbent body of gas containing oil in suspension, of a separator acting upon the outflowing gas to clean the same by separating the oil therefrom, an oil receiving surface over which the oil flows from the separator back to the body of oil in the tank, and means to direct the flow of oil from the separator to said oil receiving surface throughout the flow of said oil, in the general direction of the flow of gas through the separator.

2. In an oil and gas separator, the combination with a tank having an oil and gas inlet, an oil outlet arranged at a relatively low elevation, a gas outlet arranged at a relatively high elevation, the fluid admitted to the tank dividing into a lower body of oil and a superincumbent body of gas containing oil in suspension, of means acting upon the outflowing gas to clean the same by separating the oil therefrom, and means to divert the eliminated oil to the inner wall of the tank, and away from the gas outlet opening, so that it may flow down thereon to the body of oil in the tank, thereby minimizing reabsorption of such oil by the body of gas passing to the gas outlet from the tank.

3. In an oil and gas separator, the combination of a tank having an oil and gas inlet, an oil outlet arranged at a relatively low elevation, and a gas outlet arranged at a relatively high elevation; the gas outlet comprising a pipe and an internal spiral adapted to impart to the outflowing gas a whirling motion, thereby separating from the outflowing gas oil contained therein; and means to convey said separated oil to the body of oil in the general direction of the flow of gas in the tank.

4. In an oil and gas separator, the combination of a tank having an oil and gas inlet, an oil outlet arranged at a relatively low elevation, and a gas outlet arranged at a relatively high elevation; the gas outlet comprising a pipe and an internal spiral adapted to impart to the outflowing gas a whirling motion, thereby separating from the outflowing gas oil contained therein; there being an opening in the pipe, and a deflector adapted to catch oil escaping through said opening and convey it in the general direction of the flow of gas toward the tank wall.

5. In an oil and gas separator, the combination of a tank having an oil and gas inlet, an oil outlet arranged at a relatively low elevation, and a gas outlet arranged at a relatively high elevation; the gas outlet comprising a pipe and an internal spiral adapted to impart to the outflowing gas a whirling motion, thereby separating from the outflowing gas oil contained therein; the pipe being slotted longitudinally in its bottom, and a deflector below the slot inclined downward toward the tank wall and in the general direction of the flow of gas.

6. An oil and gas separator comprising a tank, an inlet pipe leading thereto, an outlet pipe for oil leading therefrom below the inlet pipe, an outlet pipe for gas extending from the tank above the inlet, said gas outlet pipe extending in a general horizontal direction, a spiral separator in the gas outlet pipe, a portion of the gas outlet pipe and separator therein being within the tank, there being an outlet opening in the bottom of the pipe through which the oil separated from the gas in the pipe may fall, and an oil drip pan connected to the gas outlet pipe for catching the oil falling through the outlet opening in the bottom of the gas outlet pipe, said drip pan sloping from the inner end of the gas outlet pipe toward the wall of the tank there being an oil outlet opening from the drip pan to the tank adjacent the wall of the tank.

In testimony of which invention, I have hereunto set my hand, at Toledo, Ohio, on this 11 day of March, 1922.

ALBERT M. BALLARD.